United States Patent
Lynch et al.

(10) Patent No.: US 10,550,984 B2
(45) Date of Patent: Feb. 4, 2020

(54) PIPE RESTRAINT AND SHIELD

(71) Applicant: NuScale Power, LLC, Corvallis, OR (US)

(72) Inventors: John J. Lynch, Corvallis, OR (US); Edward A. Rodriguez, Corvallis, OR (US); Tamas R. Liszkai, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 889 days.

(21) Appl. No.: 14/960,007

(22) Filed: Dec. 4, 2015

(65) Prior Publication Data

US 2017/0159867 A1 Jun. 8, 2017

(51) Int. Cl.
| | |
|---|---|
| *F16L 55/00* | (2006.01) |
| *F16L 55/07* | (2006.01) |
| *G21D 1/02* | (2006.01) |
| *F16L 23/16* | (2006.01) |

(52) U.S. Cl.
CPC ........... *F16L 55/005* (2013.01); *F16L 23/167* (2013.01); *F16L 55/07* (2013.01); *G21D 1/02* (2013.01); *F16L 2201/20* (2013.01); *F16L 2201/30* (2013.01)

(58) Field of Classification Search
CPC . F16L 23/167; F16L 2201/20; F16L 2201/30; F16L 55/005; F16L 55/07; F16L 55/175; F16L 57/00; G21D 1/02
USPC .................................. 285/14, 15, 93; 138/99
See application file for complete search history.

(56) References Cited

U.S. PATENT DOCUMENTS

| | | | | |
|---|---|---|---|---|
| 3,954,288 | A | * | 5/1976 | Smith ................... F16L 55/175 |
| | | | | 285/93 |
| 4,049,296 | A | * | 9/1977 | Harrison ............... F16L 55/175 |
| | | | | 138/99 X |
| 4,240,650 | A | * | 12/1980 | Adams .................. F16L 55/172 |
| | | | | 285/15 X |
| 4,644,780 | A | | 2/1987 | Jeter |
| 4,709,729 | A | * | 12/1987 | Harrison ......................... 138/99 |
| 5,092,631 | A | | 3/1992 | Masnick |
| 5,489,124 | A | | 2/1996 | Need |
| 8,983,018 | B2 | | 3/2015 | Lentner et al. |
| 2010/0032938 | A1 | * | 2/2010 | Jensen ............................ 285/15 |

(Continued)

OTHER PUBLICATIONS

International Search Report; PCT/US2016/016199; dated Aug. 8, 2016; pp. 1-13.

(Continued)

*Primary Examiner* — Zachary T Dragicevich
(74) *Attorney, Agent, or Firm* — Schwabe Williamson & Wyatt

(57) ABSTRACT

A pipe restraint assembly includes a restraint body configured to be removably attached to a portion of pipe. The portion of pipe is associated with a postulated pipe failure associated with a release of high pressure fluid. A plurality of apertures penetrate through the restraint body and are positioned proximate to a location of the postulated pipe failure. The apertures are configured to provide a number of passageways for the fluid to exit from the location of the postulated pipe failure and to be released outside of the restraint body. One or more restraint devices maintain the position of the apertures relative to the location of the postulated pipe failure.

15 Claims, 10 Drawing Sheets

(56) References Cited

U.S. PATENT DOCUMENTS

2014/0131991 A1   5/2014   Bellis

OTHER PUBLICATIONS

Lisega Product Catalog; Shock Absorbers, Energy Absorbers, Rigid Struts, 3; pp. 3.1-3.41.
U.S. Nuclear Regulatory Commission; Standard Review Plan, Determination of Rupture Locations and Dynamic Effect Associated with the Postulated Rupture of Piping; pp. 1-12, pp. 1-12.
AP Design Control, Design of Structures, Components, Equipment and Systems, Chapter 3, pp. 3.6-1-3.6-49.

* cited by examiner

PIPE RESTRAINT AND SHIELD

GOVERNMENT INTEREST

This invention was made with Government support under Contract No. DE-NE0000633 awarded by the Department of Energy. The Government has certain rights in this invention.

BACKGROUND

In pressurized water reactors (PWR), boiling water reactors (BWR), and other types of nuclear reactor designs, various high energy lines such as those associated with a steam generator system may be subject to pipe break. The pipe break may lead to jet impingement, pipe whip, and potential impact loads. A typical solution to mitigate or avoid the effects of the pipe break may involve attaching a pipe whip restraint to a building or other large structures to absorb the energy of the pipe breaks. For example, the pipe whip restraint may be attached to a one-foot thick concrete bioshield wall. In addition, jet impingement shields may separately be provided to protect various equipment form the jet forces, which can exceed well over 15,000 pounds of thrust.

Pipe whip restraints comprising U-bolts may be configured to dampen and absorb the kinetic energy of bursting pipes in emergency cases. Pipe whip restraints assembled in angular arrangements may be configured to absorb the forces, and the direction of the absorbed force can be determined by the particular arrangement of the U-bolts. Other types of known pipe whip restraints may comprise shock absorbers, rigid struts, and pipe clamps.

A shock absorber (or snubber) may be configured to form a semi-rigid restraint between the pipe and the structure during a seismic or dynamic event. The resulting energy in the pipes may be absorbed and transferred to the structure up to a maximum rated load, and when above that, the forces may be transformed into deformation energy by the energy absorber.

The shock absorber may comprise an adjustable free stroke to allow for slight thermal movement of the pipes. Piping may be displaced within the adjusted range of the free stroke, provided that the permissible stresses are not exceeded. As one of the most frequent causes of failure in shock absorbers is wear, these types of pipe whip restraints may be limited to applications where little operational movement is to be expected at the load application point.

Struts may form rigid restraints from one attachment point to another so as not to allow any axial movement. The struts may comprise ball bushings that form rigid connections between the pipe and the structure. Some limited angular movement may be allowed by the struts; however, from a practical matter, rigid struts are not acceptable when any significant operational movement of the pipes must be accounted for.

Pipe clamps may comprise a solid upper yoke with integrated connection bracket and, depending on the load range, one or two U-bolts with inlay plate. The bracket may be welded to the upper yoke. Instability caused by friction pipe clamps may result from creep characteristics of preset metals and, if the clamp design is too soft, the necessary stiffness may not be attained. Some clearance in the pipe clamps may be provided to accommodate minimal displacement of the piping system.

In addition to the various limitations discussed above, known pipe restraint systems require placement of the pipe whip restraints at or near a building or other large physical structure, and the requisite structure may not be located at an ideal place for attachment. The attachment of the pipes to the super structure may result in a substantial transfer of seismic or other dynamic forces between the structure and the pipes, and may operate to change the functional behavior or response of the pipe system. Additionally, even if the known pipe restraint systems are successful in keeping the pipes themselves from damaging other components, the resulting jet stream that escapes out through the pipe rupture may nevertheless cause resultant damage to the surrounding components.

This application addresses these and other problems.

SUMMARY

A pipe restraint assembly may comprise a cylindrical shaped restraint body configured to be removably attached to a portion of pipe. The portion of pipe may be associated with a postulated pipe failure associated with a release of high pressure fluid. A plurality of apertures penetrate through the restraint body and are positioned proximate to a location of the postulated pipe failure. The apertures may be configured to provide a number of passageways for the fluid to exit from the location of the postulated pipe failure and to be released outside of the restraint body. One or more restraint devices maintain the position of the apertures relative to the location of the postulated pipe failure.

A method for assembling a pipe restraint system may comprise placing a first restraint body next to a location of a postulated pipe failure associated with a pipe. The first restraint body may include a receptacle. A pipe protrusion may be located within the receptacle of the first restraint body. Additionally, a second restraint body may be placed next to the location of the postulated pipe failure. The second restraint body may be attached to the first restraint body to form a substantially cylindrical restraint body that surrounds the location of the postulated pipe failure. A plurality of perforations may pass through the cylindrical restraint body and provide a number of passageways for fluid to exit from the location of the postulated pipe failure. The fluid may be diffused through the perforations and released out of the cylindrical restraint body.

A pipe restraint assembly may comprise means for attaching a first restraint body to a second restraint body to form a substantially cylindrical restraint body that surrounds a location of a postulated pipe failure. A plurality of perforations that pass through the cylindrical restraint body may be configured to release fluid out of the cylindrical restraint body. The pipe restraint assembly may further comprise means for interconnecting the location of the postulated pipe failure to the plurality of perforations to form a passageway for the released fluid. Additionally, a means for restraining the cylindrical restraint body in an axial direction of the pipe may operate to maintain a position of the plurality of perforations proximate to the location of the postulated pipe failure.

DETAILED DESCRIPTION

Figure 1:
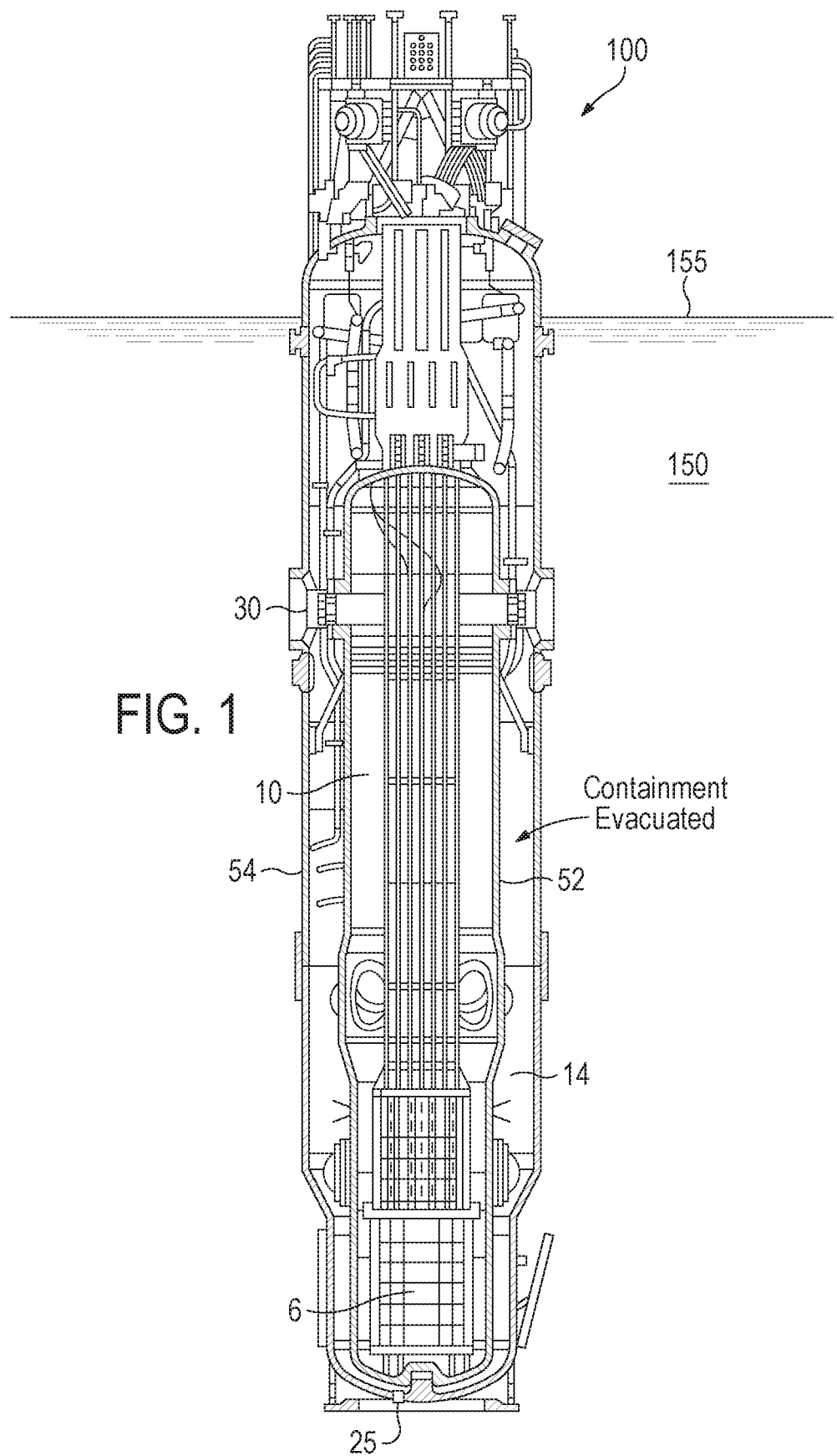
FIG. 1 illustrates an example nuclear reactor module with a dry and/or evacuated containment region.

FIG. 1 illustrates an example nuclear reactor module 100. The nuclear reactor module 100 may comprise a reactor core 6 surrounded by a reactor pressure vessel 52. Primary coolant 10 in the reactor pressure vessel 52 surrounds the reactor core 6.

Reactor pressure vessel 52 may be surrounded by a containment vessel 54. In some examples, containment vessel 54 may be located in a reactor pool 150. The reactor pool 150 may contain borated water stored below ground level. Containment vessel 54 may be at least partially submerged in the reactor pool 150. In some examples, at least a portion of the upper head of containment vessel 54 may be located above a surface 155 of the reactor pool 150 in order to keep any electrical connections and/or penetrations through the upper head dry. Additionally, containment vessel 54 may be configured to prohibit the release of any primary coolant 10 associated with reactor pressure vessel 52 to escape outside of containment vessel 54 into the reactor pool 150 and/or into the surrounding environment.

Containment vessel 54 may be approximately cylindrical in shape. In some examples, containment vessel 54 may have one or more ellipsoidal, domed, or spherical ends, forming a capsule shaped containment. Containment vessel 54 may be welded or otherwise sealed to the environment, such that fluids, liquids and/or gases are not allowed to escape from, or enter into, containment vessel 54 during normal operation of reactor module 100. In various examples, reactor pressure vessel 52 and/or containment vessel 54 may be bottom supported, top supported, supported about its center, or any combination thereof.

In some examples and/or modes of operation, an inner surface of reactor pressure vessel 52 may be exposed to a wet environment comprising the primary coolant 10 and/or vapor, and an outer surface of reactor pressure vessel 52 may be exposed to a substantially dry environment. The reactor pressure vessel 52 may comprise and/or be made of stainless steel, carbon steel, other types of materials or composites, or any combination thereof.

A containment region 14 formed within containment vessel 54 may substantially surround the reactor pressure vessel 52. The containment region 14 may comprise a dry, voided, evacuated, and/or gaseous environment in some examples and/or modes of operation. Containment region 14 may comprise an amount of air, a Nobel gas such as Argon, other types of gases, or any combination thereof. Additionally, the surfaces of one or both of reactor pressure vessel 52 and containment vessel 54 that bound containment region 14 may be exposed to water during certain modes of operation such as refueling, shutdown, or transport within the reactor pool 150.

Containment region 14 may be maintained at or below atmospheric pressure, including a partial vacuum of approximately 300 mmHG absolute (5.8 psia) or less. In some examples, containment region 14 may be maintained at approximately 50 mmHG absolute (1 psia). In still other examples, containment region 14 may be maintained at a substantially complete vacuum. Any gas or gases in containment vessel 54 may be evacuated and/or removed prior to operation of reactor module 100. During normal operation of reactor module 100, containment region 14 may be kept dry and/or evacuated of any water or fluid. Similarly, containment region 14 may be kept at least partially evacuated of any air or gases.

A heat exchanger may be configured to circulate feedwater and/or steam in a secondary cooling system in order to generate electricity. In some examples, the feedwater passes through the heat exchanger and may become super-heated steam. The feedwater and/or steam in the secondary cooling system are kept isolated from the primary coolant 10 in the reactor pressure vessel 52, such that they are not allowed to mix or come into direct (e.g., fluid) contact with each other.

The heat exchanger and/or associated piping of the secondary cooling system may be configured to penetrate through reactor pressure vessel 52 at one or more plenum 30. Additionally, the secondary piping may be routed to the upper region of containment above the level of the reactor pool 150, where the piping penetrates through containment vessel 54. By exiting containment above the reactor pool 150, the high temperature steam and feedwater lines do not loose heat to the reactor pool water 150.

A fluid sensor 25 may be positioned in the lower head of the containment vessel 54. The fluid sensor 25 may be configured to detect when any fluid has leaked into the containment region 14. For example, in the event of a pipe failure in the heat exchanger or secondary cooling system, fluid may be inadvertently released into the containment region and collect in the lower head. In response to the detection of fluid by fluid sensor 25, the reactor module 100 may be shut down and/or scheduled for maintenance.

Criteria used to define break and crack locations may comprise an analysis of the jet thrust reaction at the postulated pipe break or crack location and jet impingement loadings on adjacent safety-related structures, systems, and components (SSC). Additionally, the criteria may comprise a consideration of the integrity and operability of mechanical components, component supports, and piping systems, including restraints and other protective devices, under postulated pipe rupture loads.

Accordingly, nuclear power plant SSC designed to accommodate the effects of environmental conditions associated with normal operation, maintenance, testing, and postulated accidents, including loss-of-coolant accidents, may be configured to be protected against certain dynamic effects, including pipe-whipping and discharging fluids.

As provided in the Standard Review Plan of the U.S. Nuclear Regulatory Commission (chapter 3.6.2, Determination of Rupture Locations and Dynamic Effects Associated with the Postulated Rupture of Piping, Revision 2, March 2007), one or more models may be used to evaluate the effectiveness of a pipe restraint system, including a lumped parameter analysis model, in which mass points are interconnected by springs to take into account inertia and stiffness properties of the system, and time histories of responses are computed by numerical integration, taking into account clearances at restraints and inelastic effects. In the calculation, the maximum possible initial clearance may be used to account for the most adverse dynamic effects of pipe-whip.

In an energy balance analysis model, kinetic energy generated during the first quarter cycle movement of the rupture pipe and imparted to the piping and restraint system through impact is converted into equivalent strain energy. In the calculation, the maximum possible initial clearance at restraints may be used to account for the most adverse dynamic effects of pipe-whip.

In a static analysis model, the jet thrust force is represented by a conservatively amplified static loading, and the ruptured system is analyzed statically. An amplification factor can be used to establish the magnitude of the forcing function. However, the factor should be based on a conservative value obtained by comparison with factors derived from detailed dynamic analyses performed on comparable systems.

On the other hand, in a dynamic analysis model, the time-dependent function representing the thrust force caused by jet flow from a postulated pipe break or crack may include the combined effects of the following: the thrust pulse resulting from the sudden pressure drop at the initial moment of pipe rupture; the thrust transient resulting from wave propagation and reflection; and the blowdown thrust resulting from buildup of the discharge flow rate.

The jet thrust force may be represented by a steady state function having a magnitude not less than T=KpA, where p=system pressure prior to pipe break, A=pipe break area, and K=thrust coefficient. The K values may be greater than or equal to 1.26 for steam, saturated water, or stream-water mixtures or 2.0 for subcooled, nonflashing water. Assumptions in modeling jet impingement forces may comprise:

The jet area expands uniformly at a half angle, not exceeding ten degrees.

The impinging jet proceeds along a straight path.

The total impingement force acting on any cross-sectional area of the jet is time and distance invariant, with a total magnitude equivalent to the jet thrust force.

The impingement force is uniformly distributed across the cross-sectional area of the jet, and only the portion intercepted by the target is considered.

The break opening may be assumed to be a circular orifice of cross-sectional flow area equal to the effective flow area of the break.

An unrestrained whipping pipe may be capable of causing circumferential and longitudinal breaks, and/or through-wall cracks in the pipes. The pipe restraint may be configured such that the pipe motion will not result in the impairment of the essential functions of the SSC. The effects of the pipe motion may be evaluated in terms of the kinetic energy or momentum induced by the impact of the whipping pipe, if unrestrained, upon a protective barrier or a component important to safety and to determine the dynamic response of the restraints induced by the impact and rebound, if any, of the ruptured pipe.

Figure 2:
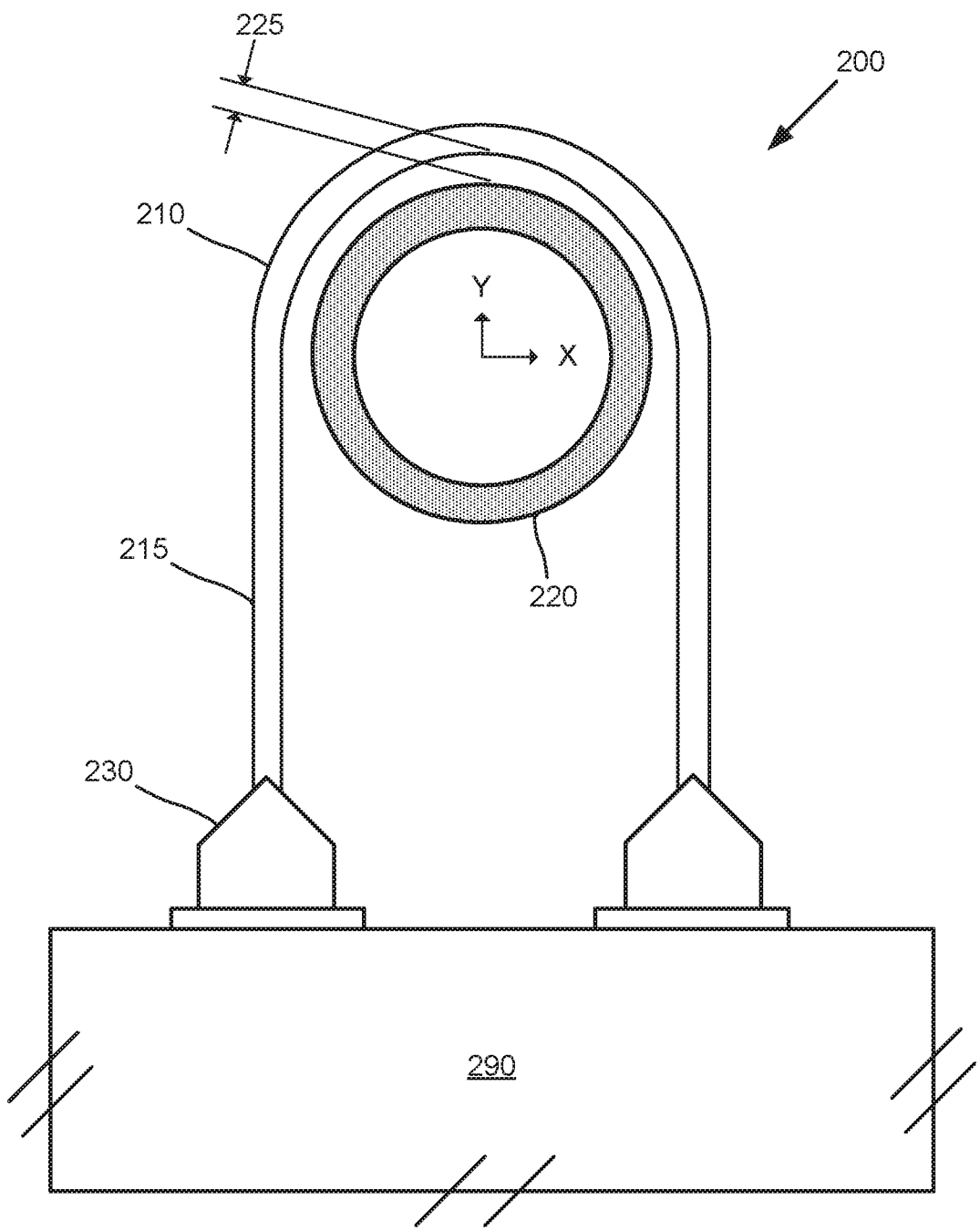
FIG. 2 illustrates an example pipe restraint system comprising a U-bolt.

FIG. 2 illustrates an example pipe restraint system 200 comprising a U-bolt 210. The U-bolt 210 may be rigidly attached to a super structure 290 by one or more mounting brackets 230. For example, the one or more mounting brackets 230 may be mounted to the super structure 290 with a number of attachment bolts. The super structure 290 may include a concrete containment building wall or bio shield, which may be several feet in thickness, and a large number of U-bolts may be used to secure piping to the structure 290.

The U-bolt 210 may be placed about a pipe 220 prior to attaching the U-bolt 210 to the super structure 290. The pipe 220 may comprise a portion of a steam generation system, such as for a nuclear reactor. An inner diameter of the U-bolt 210 may be larger than the outer diameter of the pipe such that a gap 225 is formed around at least a portion of the pipe 220. The gap 225 may be sized to account for thermal expansion or dynamic movement of the pipe 220 within the U-bolt 210.

Additionally, the U-bolt 210 may be designed such that the pipe 220 may remain spaced away from the super structure 290 so as to not contact either the U-bolt 210 or the super structure 290 during normal operation of the steam generation system. U-bolt arms 215 may extend from around the pipe 210 to the mounting brackets 230.

In the event of a seismic or dynamic force that may cause the pipe 220 to move, the U-bolt 210 may be configured to restrain lateral movement of the pipe 220 in the X-Y plane. For example, the exterior surface of the pipe 220 may come into contact with inner surface of the U-bolt 220. Because the pipe 220 is not coupled directly to the U-bolt 210, the system 200 may not restrain or otherwise inhibit axial movement of the pipe 220, in a direction perpendicular to the X-Y plane, as a result of the seismic or dynamic force.

In the event of a rupture in the pipe 220 that may occur at or near the U-bolt 210, fluid contained within the pipe 220 may be unintentionally released at a high pressure, as a jet impingement, which may damage other components contained within the structure 290. Additionally, the stresses associated with the pipe rupture and/or other dynamic forces may result in a complete pipe break in which a free end of the pipe 220 could work its way out of the U-bolt 210 and become unrestrained. The unrestrained pipe end may then result in additional damage to any components contained within the structure 290, or to the structure 290.

Figure 3:
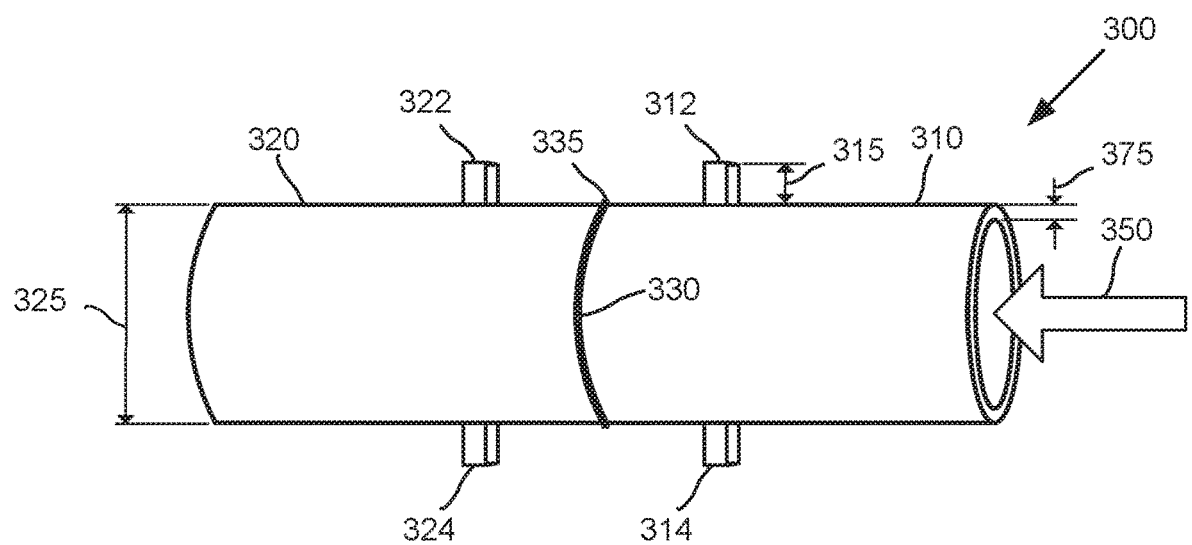
FIG. 3 illustrates an example pipe assembly with restraints.

FIG. 3 illustrates an example pipe assembly 300 comprising one or more restraints. Pipe assembly 300 may comprise two sections of pipe welded or otherwise attached together at a pipe interface. For example, a first section of pipe 310 may be attached to a second section of pipe 320 at a weldment 330. The weldment 330 may be formed at the pipe interface.

During construction of a pipe assembly that may include multiple sections of pipe welded together, the weldment 330 may be ground down and polished to form a substantially smooth surface between adjacent pipe sections 310, 320. However, in some examples, the weldment 330 may intentionally be built up to form a ridge or ring 335 that may at least partially encompass the circumference of the pipe assembly 300.

The pipe assembly 300 may be configured to allow the flow of fluid 350 from the first pipe section 310 to the second pipe section 320, such that the pipe assembly 300 effectively performs as a single pipe. Pipe assembly 300 may be associated with an outer diameter 325 that is substantially uniform as between adjacent sections of pipe. An inner diameter of the pipe assembly 300 may be somewhat smaller than the outer diameter 325 to account for a wall thickness 375 of the pipe assembly 300.

A first restraint 312, such as a stud, may be welded to or otherwise attached to the first section of pipe 310. In some examples, first restraint 312 may be formed as an integral feature or protrusion of the first section of pipe 310 during a manufacturing process of the pipe assembly 300. First restraint 312 may be associated with a restraint height 315 as measured from the outer surface of the first section of pipe 310. In some examples, the height 315 may be greater than the wall thickness 375.

A second restraint 322 may be welded to or otherwise attached to the second section of pipe 320, such that at least one restraint may be located on either side of weldment 330. Second restraint 322 may project from the exterior surface of the second section of pipe 320 by the same height 315 associated with first restraint 312.

In some examples, a set of restraints may be located on either side of weldment 330. A first set comprising first restraint 312 and an additional restraint 314 associated with the first section of pipe 310 may be located on a first side of weldment 330, and a second set of restraints comprising second restraint 322 and an additional restraint 324 associated with the second section of pipe 320 may be located on a second side of weldment 330, opposite the first set of restraints.

The location of first restraint 312 on the first section of pipe 310 is illustrated as being at 180 degrees of rotation about the circumference of the first section of pipe 310 as compared to the location of the additional restraint 314. However, the location and/or spacing of the restraints may be varied, for example three or four restraints may be located at 120 degrees or 90 degrees, respectively, about the circumference of one or both pipe sections.

Figure 4:
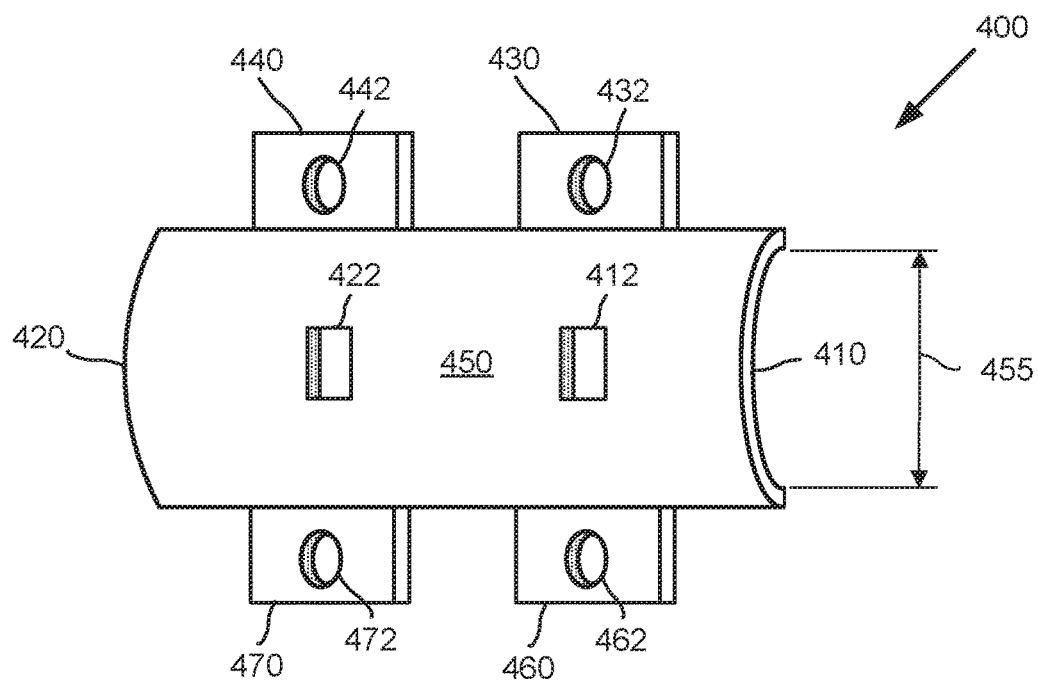
FIG. 4 illustrates an example pipe restraint device.

FIG. 4 illustrates an example pipe restraint device 400. The pipe restraint device 400 may comprise a restraint body 450 shaped as a partial cylinder having an inner diameter 455. In some examples, restraint body 450 may be formed by cutting a pipe of diameter 455 in half lengthwise, creating two partial cylinders of equal dimensions. In other examples, restraint body 450 may be fabricated as a half or partial cylinder having a first end 410 and a second end 420.

One or more attachment plates may be located at either end of restraint body 450. For example, a first attachment plate 430 and a second attachment plate 460 may be located at a first half of restraint body 450 associated with first end 410. First attachment plate 430 may be welded or otherwise attached to one side of restraint body 450, and second attachment plate 460 may be welded or otherwise attached on an opposite side of restraint body 450. Similarly, two attachment plates 440, 470 may be welded or otherwise attached at a second half of restraint body 450 associated with second end 420.

A first hole 432 may penetrate through first attachment plate 430, and a second hole 462 may penetrate through second attachment plate 460. First and second holes 432, 462 may be sized and/or otherwise configured to be fitted with a hex bolt, a U-bolt, a rod, a latch, a cable, other types of securing devices, or any combination thereof. The securing devices may be configured to secure restraint body 450 to another structure, such as a second restraint body having the same inner diameter 455. The second restraint body may similarly have two attachment plates, with through-holes, that correspond in location to first and second attachment plates 430, 460. Additionally, attachment plates 440, 470 may be configured with through-holes 442, 472, respectively, to provide further means of attaching restraint body 450 to another structure.

A number of restraint openings or apertures may be cut out, punched, or otherwise formed through the restraint body 450. A first restraint opening 412 is illustrated as passing through the first half of restraint body 450 associated with the first end 410, and a second restraint opening 422 is illustrated as passing through the second half of restraint body 450 associated with the second end 420. First and second restraint openings 412, 422 are shown as being generally rectangular in shape, although other shapes such as holes, squares, and other geometric configurations are contemplated herein.

Figure 5:
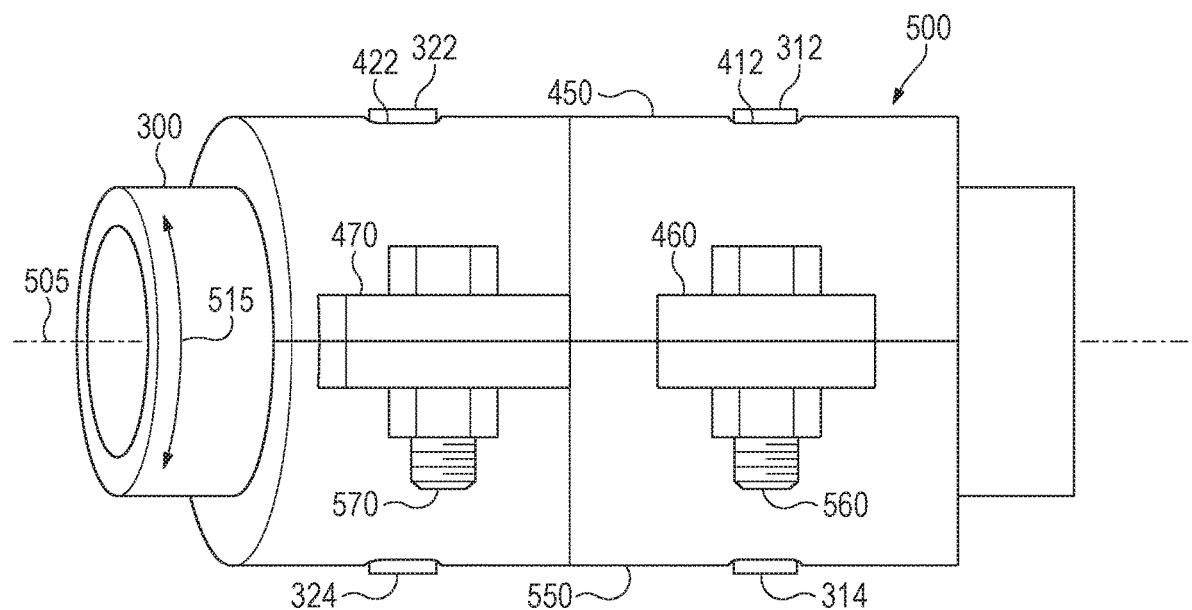
FIG. 5 illustrates an example pipe restraint assembly mounted around a pipe.

FIG. 5 illustrates an example pipe restraint assembly 500 mounted around a pipe, such as pipe assembly 300 (FIG. 3). Pipe restraint assembly 500 may comprise one or more pipe restraint devices, such as pipe restraint device 400 (FIG. 4) including restraint body 450. The restraint body 450 of a first pipe restraint assembly may be attached to a second restraint body 550. In some examples, the second restraint body 550 may be substantially identical to the first restraint body 450, including a number of attachment plates, similar to attachment plates 460, 470, and/or a number of restraint openings, similar to restraint openings 412, 422.

First restraint body 450 may be removably attached to second restraint body 550 by a plurality of securing devices, such as a first bolt 560 and a second bolt 570. First and second bolts 560, 570 may pass through first and second attachment plates 460, 470, respectively. In some examples, pipe restraint assembly 500 may be mounted about a pipe assembly that has already been installed in an industrial plant or facility. For example, pipe assembly 300 may essentially be immovable or at a fixed location for purposes of being fitted with pipe restraint assembly 500.

During installation of pipe restraint assembly 500 about pipe assembly 300, the first restraint body 450 may initially be located about one half of pipe assembly 300. As the first restraint body 450 is brought into proximity with the outer surface of the pipe assembly 300, the first and second restraints 312, 322 may pass into and/or through the first and second restraint openings 412, 422, respectively, of first restraint body 450.

The first and second restraint openings 412, 422 may be sized to provide sufficient tolerance with respect to first and second restraints 312, 322 such that first restraint body 450 may be readily lowered onto, and lifted from, the pipe assembly 300. The tolerance may expedite installation and/or removal of pipe restraint assembly 500 such as may be associated with a maintenance or inspection procedure. Additionally, the tolerance may provide clearance to accommodate any thermal expansion which may act upon one or more of the components.

In other examples, first and second restraint openings 412, 422 may be sized such that first and second restraints 312, 322 may be press-fit into the openings during installation of first restraint body 450 on to pipe assembly 300. While first restraint body 450 may still be removable, a press-fit installation may reduce certain effects of vibration that may result from any dynamic forces.

After the first restraint body 450 has been fitted up against the pipe assembly, or in some examples concurrently therewith, the second restraint body 550 may be located about the other half of pipe assembly 300. As the second restraint body 550 is brought into proximity with the outer surface of the pipe assembly 300, restraints 314, 324 may pass into and/or through the restraint openings associated with second restraint body 550. Once both restraint bodies 450, 550 have been located about the circumference of pipe assembly 300, the bolts 560, 570 may be used to secure pipe restraint assembly 500 around pipe assembly 300.

With pipe restraint assembly 500 secured about pipe assembly 300, restraints 312, 322, 314, 324 may operate to limit and/or prohibit movement of pipe restraint assembly 500 with respect to pipe assembly 300. For example, the restraints 312, 322, 314, 324 may operate to limit movement of pipe restraint assembly 500 in one or both of an axial direction 505 of the pipe assembly 300 and in a rotational direction 515 about the circumference of the pipe assembly 300.

By limiting the movement of pipe restraint assembly 500, the position of pipe restraint assembly 500 can similarly be maintained with respect to any postulated leak points. For example, the weldment 330 of pipe assembly 300 may be located between first and second attachment plates 460, 470. Any force or jet impingement that may be exerted within pipe restraint assembly 500 due to a pipe rupture at the weldment 330 may be approximately evenly distributed between both attachment plates 460, 470 located on either half of the restraint body 450. An even force distribution within pipe restraint assembly 500 may reduce twist, shear, and other forces that may facilitate a failure of one or more components, such as bolts 560, 570. Additionally, the initial impact of the jet impingement may be centralized within pipe restraint assembly 500, where it can be shielded and controllably released into the surrounding environment.

Pipe restraint system 500 effectively provides its own support structure by interlocking the pipe bodies 450, 550 with the pipe assembly 300. Accordingly, the pipe restraint system 500 may be utilized in open spaces or across distances where there is not a super structure that the pipe restraint system may be attached to.

Figure 6:
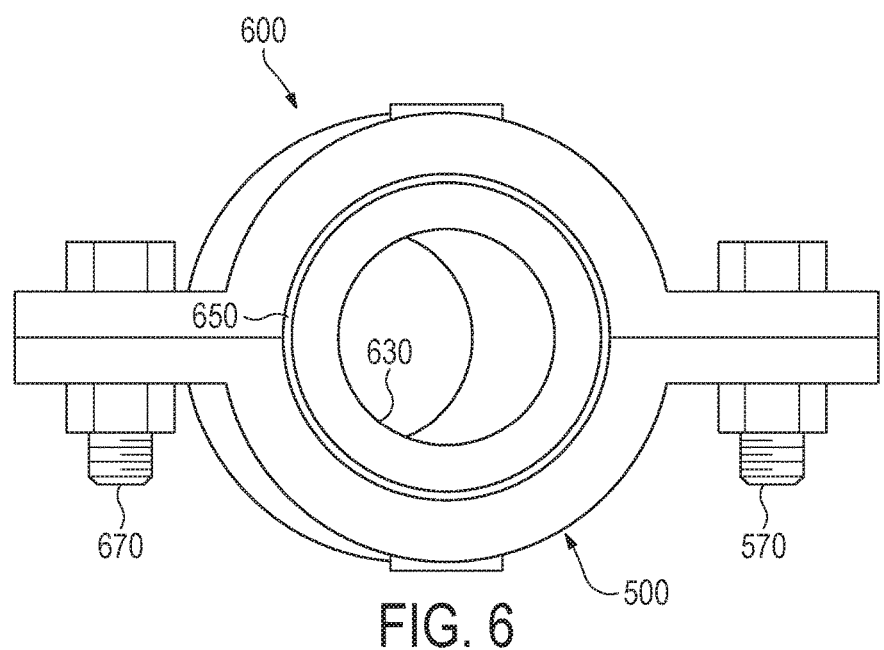
FIG. 6 illustrates a cross-sectional view of an example pipe restraint system comprising the pipe restraint assembly of FIG. 5.

FIG. 6 illustrates a cross-sectional view of an example pipe restraint system 600 comprising the pipe restraint assembly 500 of FIG. 5. The pipe restraint assembly 500 is illustrated as being secured about a pipe 630 by a plurality of securing devices 570, 670, such as bolts. In some examples, pipe 630 may be configured similarly as pipe assembly 300 (FIG. 3), including one or more restraint devices that penetrate through the wall of pipe restraint assembly 500.

The outer diameter of pipe 630 may be sized smaller than the inner diameter of pipe restraint assembly 500 such that a retention gap 650 may be formed about the circumference of pipe 630. In some examples, the retention gap 650 may completely encircle the circumference of pipe 630 along one or more axial locations. Retention gap 650 may be configured to account for any thermal expansion of pipe 630 relative to pipe restraint assembly 500. For example, superheated fluid passing through pipe 630 may cause the outer diameter of pipe 630 to expand such that the retention gap 650 may become smaller, but still provide some amount of clearance between pipe 630 and pipe restraint assembly 500.

Additionally, retention gap 650 may be configured to restrain or capture fluid that may leak out of a pipe rupture that occurs to the portion of pipe 630 located within pipe restraint assembly 500. For a pipe having a diameter of several inches, retention gap 650 may provide approximately one tenth of an inch of spacing between the pipe 630 and the pipe restraint assembly 500. For example, pipe 630 may be associated with a diameter of four inches, and pipe restraint assembly 500 may be associated with a diameter of five inches. In other examples, pipe 630 may be associated with a diameter of six inches, and pipe restraint assembly 500 may be associated with a diameter of eight inches. Other diameters of pipes and corresponding pipe restraints are contemplated herein.

Figure 7:
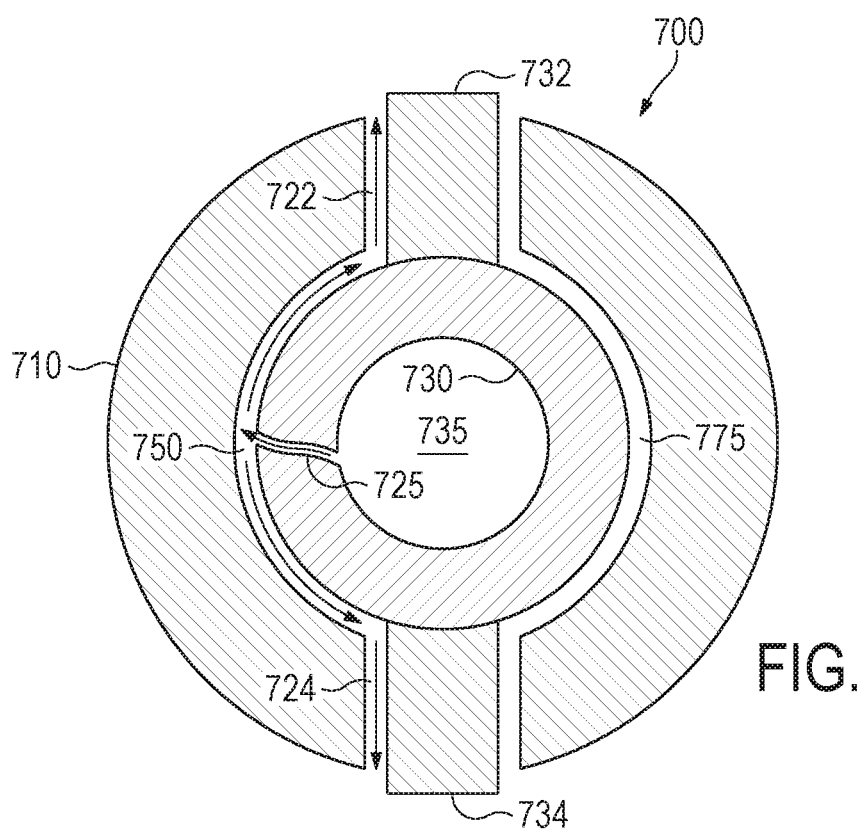
FIG. 7 illustrates a cross-sectional view of an example pipe restraint system configured to control a pipe failure.

FIG. 7 illustrates a cross-sectional view of an example pipe restraint system 700 configured to control a pipe failure. Pipe restraint system 700 may comprise one or more pipe restraint assemblies, such as a pipe restraint assembly 710, which may be configured similarly to pipe restraint assembly 500 (FIG. 5).

Pipe restraint system 700 may be designed for postulated pipe break effects based on energy absorption criteria, such as the amount of jet force thrust that may be experienced as a result of the pipe break, and in consideration of the elastic-plastic and/or strain-hardening behavior of the materials used for manufacturing the pipe whip restraint.

A portion of the pipe restraint assembly 710 assembly may be located around a pipe 730, but not in contact with the pipe 730, to allow for unimpeded pipe motion during seismic, thermal, and/or dynamic movement of the pipe. A retention gap 750 may be provided between the pipe 730 and the energy-absorbing material of the pipe restraint assembly 710. At rupture, the pipe 730 may move against the interior surface of the pipe restraint assembly 710. Pipe restraint assembly 710 may be configured to absorb the kinetic energy of the pipe motion by yielding plastically. The material used to manufacture the pipe restraint assembly 710 may consist of stainless steel.

One or more restraints, such as a first restraint 732 and a second restraint 734, may be attached to pipe 730. First restraint 732 may be configured to be retained within a first restraint opening 722 of pipe restraint assembly 710. Similarly, second restraint 734 may be configured to be retained within a second restraint opening 724 of pipe restraint assembly 710. One or both of first and second restraint openings 722, 724 may be sized to provide for a gap about the peripheries of first and second restraints 732, 734.

A crack or fissure 725 may form through the wall of pipe 730 in the event of the pipe failure. Pipe 730 may be configured to transport fluid and/or steam at relatively high pressures through a pipe channel 735 located within the pipe wall. As a result of the pipe failure, a portion of the fluid within the pipe channel 735 may escape out through fissure 725 into the surrounding retention gap 750 formed between the pipe 730 and the pipe restraint assembly 710.

Retention gap 750 may be configured to provide a passageway for the fluid that escapes through the fissure 725 to pass through one or both of first and second restraint openings 722, 724. A plurality of passageways may be fluidly connected within pipe restraint assembly 700 to provide for the controlled release, ventilation or diffusion of the escaping fluid. For example, a second retention gap 775 may be fluidly coupled to fissure 725 and/or to retention gap 750 to provide a further passageway to additional restraint openings for the controlled release of the fluid out of pipe restraint assembly 710.

By providing a plurality of passageways and/or a plurality of openings out into the surrounding environment, pipe restraint system 700 may be configured to diffuse the force associated with the released fluid. Instead of a single release of the fluid into the environment out of fissure 725, the fluid may instead be released through a plurality of openings so that any jet impingement related to the released fluid is not focused on a single point. Additionally, the pressure associated with the released fluid may be substantially decreased or dissipated as it is routed through the one or more passageways and out through the various openings.

Pipe restraint system 700 may be configured such that the fissure 725 represents a postulated rupture that occurs at the approximate mid-point of pipe restraint assembly 710. For example, with reference to FIG. 5, fissure 725 may be assumed to occur at a section of the pipe assembly 300 intermediate first restraint 312 and second restraint 322. The fluid that escapes out of pipe assembly 300 may be controllably released through both first pipe restraint opening 412 and second pipe restraint opening 422, in addition to other restraint openings that may be fluidly connected within pipe restraint assembly 500.

In some examples, a portion of the escaping fluid may be vented out of pipe restraint assembly 500 along the surface of pipe assembly 300 in the axial direction 505, such as through a retention gap formed on the interior surface of restraint body 450 and/or second restraint body 550.

The pipe restraint systems may be configured to keep the broken pipe ends from separating, and providing pressure relief holes to allow the discharging fluid to make very small, low pressure flow, unlike the flow which would result from a pipe break with full open area. One or more of the example pipe restraint systems disclosed herein may therefore be understood to provide a pipe whip restraint, a jet impingement shield, and a pressure diffuser into one compact design.

In addition to providing a pressure gate that may operate to diffuse the pressure of the escaping fluid, retention gaps 750, 775 may be configured to allow for thermal expansion of the pipe 730 during normal operation as well.

Figure 8:
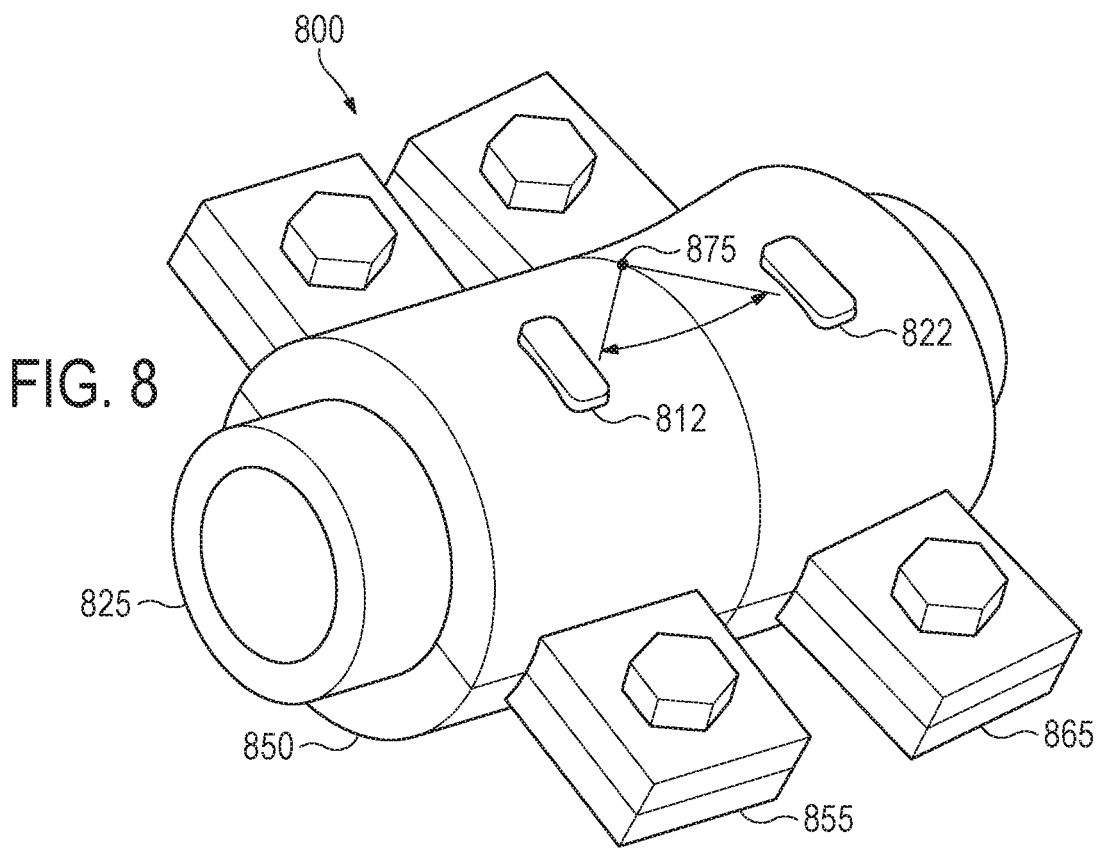
FIG. 8 illustrates an example pipe restraint assembly configured to restrain a curved pipe.

FIG. 8 illustrates an example pipe restraint assembly 800 configured to restrain a curved portion of pipe 825. A plurality of restraints, such as a first restraint 812 and a second restraint 822 may be attached to or otherwise located on pipe 825. In some examples, first restraint 812 may be located on one side of the pipe curve's radius of curvature focal point 875 and second restraint 822 may be located on the opposite side of the focal point 875.

Pipe restraint assembly 800 may be located proximate to the location of the pipe 825 which is associated with the largest amount of bending force. For example, pipe restraint system 800 may be configured to control a postulated pipe break which occurs at a portion of the curved pipe 825 located intermediate first restraint 812 and second restraint 822.

Pipe restraint assembly 800 may comprise one or more pipe restraint bodies 850. Pipe restraint body 850 may be removably coupled to pipe 825 via one or more securing devices, such as first securing device 855. In some examples, first securing device 855 may be located on one side of the pipe's radius of curvature focal point 875 and a second securing device 865 may be located on the opposite side of the focal point 875.

Other than those assemblies configured to restrain straight sections of pipe and curved sections of pipe, as variously illustrated herein, additional configurations for pipe restraint assemblies are contemplated. For example, pipe restraint assemblies similar to those discussed in this application may be configured for various pipe connections, such as a bent pipe connected to a straight pipe, a bent or straight pipe connected to a valve, a piping T-juncture, a pipe radius reducer, other types of pipe connections, or any combination thereof.

Some of the above mentioned pipe connections may effectively be configured as a straight pipe to straight pipe configuration by using a long neck welding flange and/or extending bends into a short tangent of straight pipe at the ends of the pipe sections. Additionally, safe end to straight pipe welds may be made substantially the same as straight pipe to straight pipe welds by use of long safe ends. By modifying or otherwise configuring the various types of pipe connections, a pipe restraint assembly may become compatible with a number of different pipe configurations.

Figure 9A:
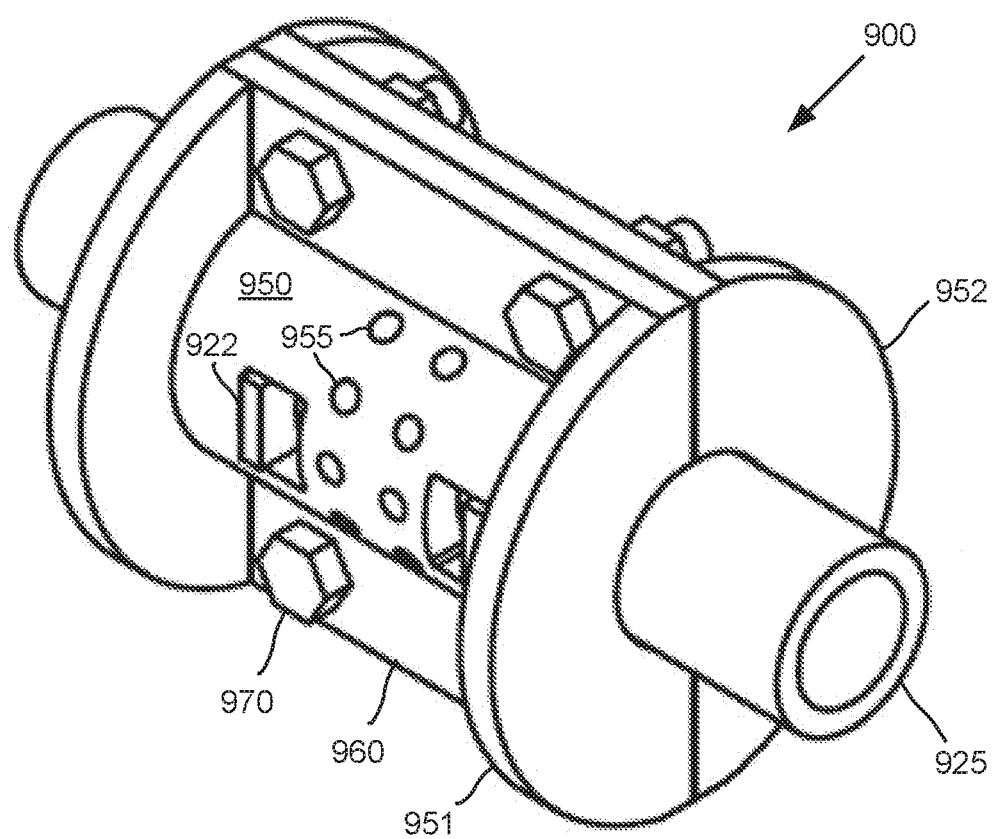
FIG. 9A illustrates an example pipe restraint assembly comprising a plurality of diffusion holes.

FIG. 9A illustrates an example pipe restraint assembly 900 comprising a plurality of diffusion holes 955. The diffusion holes 955 may penetrate through the wall of a restraint body 950. Additionally, the diffusion holes 955 may be located proximate to a postulated break point in a pipe 925.

The pressure associated with the fluid and/or steam that is released out of the postulated break point may be diffused by pipe restraint assembly 900 via a plurality of interconnected passageways including diffusion holes 955. One or more restraint devices 922 may be configured to maintain the position of diffusion holes 955 proximate to the postulated break point.

Diffusion holes 955 may be sized such that they are able to release an amount of fluid at a pressure which is less than the pressure associated with the postulated pipe failure. Accordingly, the pressure within restraint body 950 may be maintained at a pressure which is less than the system pressure (e.g., less than the pressure of the fluid within the pipe 925). In some examples, diffusion holes 955 may comprise pressure relief valves.

Pipe restraint assembly 900 may be configured to carry the original piping loads that exist before any pipe break. Accordingly, no significant changes in piping geometry would need to be provided to accommodate pipe restraint assembly 900. Further, pipe restraint assembly 900 may be configured to maintain relatively low strain areas in the pipe and preclude the likelihood of a pipe break in the first instance.

Restraint body 950 may be removably attached around the circumference of pipe 925 by a mounting plate 960 and one or more securing devices 970, such as bolts. In some examples, a second restraint body may be attached to restraint body 950 by the one or more securing devices 970. The second restraint body may be configured substantially the same as restraint body 950, including a plurality of diffusion holes.

Pipe restraint assembly 900 may comprise one or more end plates, such as end plate 951. In some examples, a first half of endplate 951 may be welded on to restraint body 950 and a second endplate half 952 may be welded on to the second restraint body. End plate 951 may be configured to provide pipe restraint assembly 900 with increased radial strength and/or rigidity, such as to resist pipe bending moments.

Pipe restraint system 900 may be configured to take into account the loading conditions of a pipe run during operation of a nuclear reactor at power, including the internal pressure, temperature, and inertial effect. Additionally, in response to the jet thrust developed after a postulated rupture, the pipe restraint system 900 may be configured to account for the mass inertia and stiffness properties of the system, the impact and rebound, the elastic and inelastic deformation of piping and restraints, and the support boundary conditions.

In addition to mitigating and/or diffusing the effects of a postulated pipe break, pipe restraint assembly 900 may be configured to preclude or otherwise inhibit the pipe 925 from failing in the first instance, by providing additionally support about the pipe against any twisting, bending, elongation, expansion, vibration, shock or other types of forces.

Pipe restraint assembly 900 may be located proximate to any other location in which regulatory standards may identify as postulated break points, such as at pipe welds, pipe terminals, vessel penetrations, pipe junctions, pipe reducers, other types of pipe system components, or any combination thereof.

Pipe restraint assembly 900 may be configured to combine the functionality of a pipe whip restraint and jet impingement shield. Additionally, the body 950 of pipe restraint assembly 900 may be removably attached to pipe 925 to provide access for pipe-weld inspections, including piping butt welds, lug welds, and other types of welds.

In some examples, the wall thickness associated with body 950 may be greater than the wall thickness of pipe 925. Additionally, a sleeve section modulus associated with pipe restraint assembly 900 may be greater than pipe 925. Pipe restraint assembly 900 may be configured to carry the original piping moments.

Figure 9B:
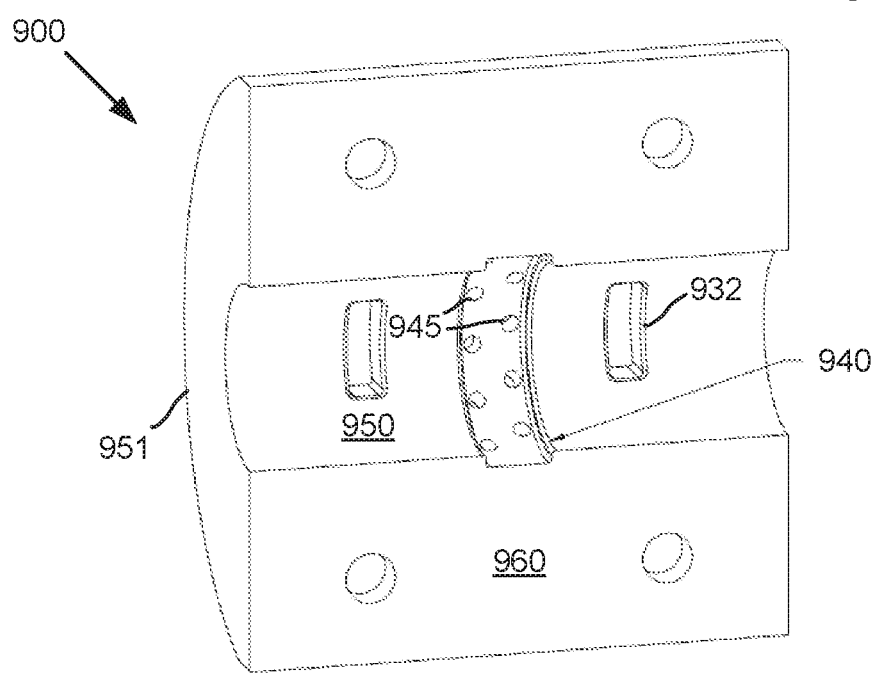
FIG. 9B illustrates a cross-sectional view through the example pipe restraint assembly of FIG. 9A.

FIG. 9B illustrates a cross-sectional view through the example pipe restraint assembly 900 of FIG. 9A. The cross-sectional view may be visible upon removal of the first half of end plate 951 from the second endplate half 952 (FIG. 9A). For example, pipe restraint assembly 900 may be disassembled by removing the securing devices 970 (FIG. 9A) from mounting plate 960. Additionally, the cross-sectional view is provided without the pipe of FIG. 9A for purposes of illustration.

The body 950 of pipe restraint assembly 900 may comprise one or more restraint openings 932 configured to receive a restraint device, such as restraint device 922 (FIG. 9A). Additionally, a pressure relief chamber 940 may be provided in body 950. In some examples, pressure relief chamber 940 may be located at an approximate mid-point of pipe restraint assembly 900 proximate to a postulated pipe break.

Pressure relief chamber 940 may comprise a plurality of offset diffusion holes 945, which are illustrated as an optional configuration of body 950 as compared to the diffusion holes 955 illustrated in FIG. 9A. Pressure relief chamber 940 may be configured to direct fluid resulting from a postulated pipe break into diffusion holes 945. Diffusion holes 945 may be configured to release the fluid out of body 950 at a relatively low pressure.

Additionally, pressure relief chamber 940 may be configured to controllably release the pressurized fluid out of diffusion holes 945. For example, pressure relief chamber 940 may be configured to provide a buffer that temporarily delays the release of any pressure buildup within body 950 so that the pressure may instead be released out of diffusion holes 945 over a longer period of time, and at a lower pressure.

Figure 10:
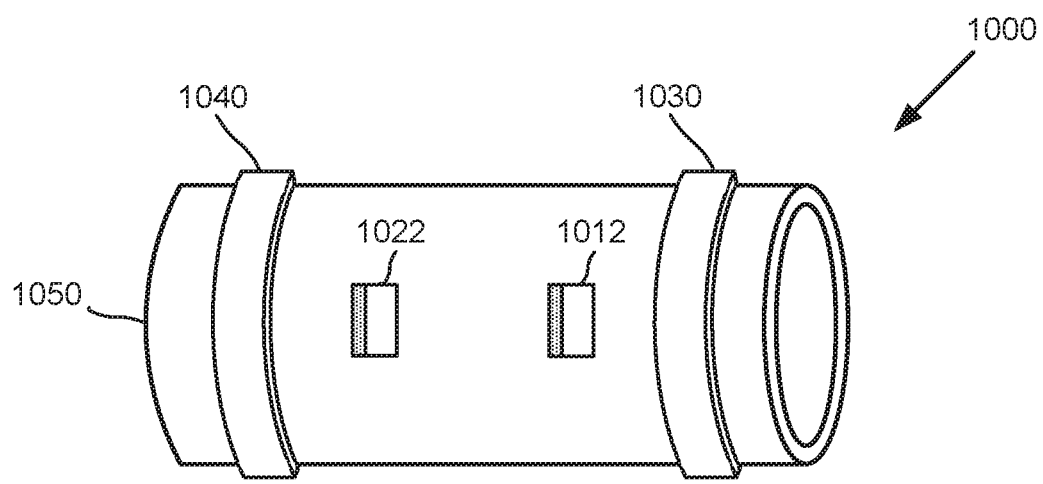
FIG. 10 illustrates an example pipe restraint device.

FIG. 10 illustrates an example pipe restraint device 1000 comprising a plurality of metal securing bands. A first securing band 1030 may be configured to secure a first end of a restraint body 1050 about a section of pipe, and a second securing band 1040 may be configured to secure a second end of restraint body 1050 about the pipe. In some examples, restraint body 1050 may comprise two substantially identical halves which may be mounted to each other on opposite sides of the pipe.

Additionally, a number of openings or apertures, such as a first opening 1012 and a second opening 1022 may be formed through the restraint body 1050. The first and second openings 1012, 1022 may be configured as outlets that controllably release any fluid or steam which escapes the pipe in a postulated pipe failure. In some examples, first and second openings 1012, 1022 may be configured to maintain the axial and/or rotational position of restraint body 1050 relative to the pipe. For example, first and second openings 1012, 1022 may be configured to receive one or more pipe projections that are welded to or otherwise attached to the pipe.

Figure 11:
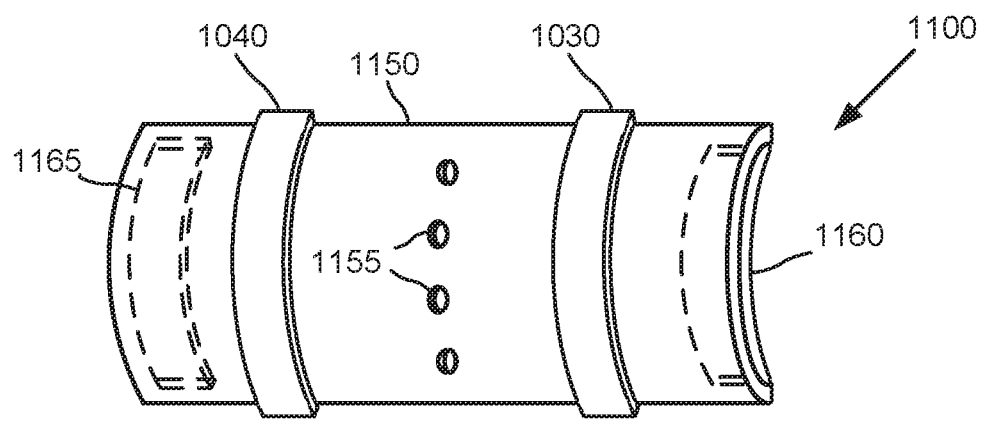
FIG. 11 illustrates another example pipe restraint device.

FIG. 11 illustrates another example pipe restraint device 1100 comprising a restraint body 1150. In addition to one or more securing devices 1030, 1040 that may be configured to mount restraint body 1150 to a pipe, a restraint pad 1160 may be located on the interior surface of restraint body 1150. Restraint pad 1160 may be configured to provide a compression fit between restraint body 1150 and the pipe. The friction which results from assembling pipe restraint device 1100 and pressing restraint pad 1160 against the pipe may operate to maintain the axial and/or rotational position of restraint body 1150 relative to the pipe.

In some examples, restraint pad 1160 may comprise a metal pad. In other examples, restraint pad 1160 may comprise a thermal and chemical resistant material, such as a rubber seal, which may be configured to materially compress between restraint body 1150 and the pipe. A second restraint pad 1165 may be located at an opposite end of restraint body 1150 as restraint pad 1160.

Additionally, a number of diffusion holes 1155 may be may be formed through the restraint body 1150. The diffusion holes 1155 may provide for a number of outlets configured to controllably release any fluid or steam which escapes the pipe in a postulated pipe failure. Restraint pad 1160 and/or second restraint pad 1165 may be configured to maintain the position of diffusion holes 1155 proximate to a postulated break point in the pipe.

Restraint pad 1160 may be configured to indicate the presence of fluid and/or moisture. For example, restraint pad 1160 may be configured with an electrical connection that is enabled in the presence of moisture. The electrical connection may cause a signal to be generated. In other examples, restraint pad 1160 may be configured to turn color in the presence of moisture. The electrical signal or change in color may be used to identify where a possible pipe failure and/or leakage is occurring in a pipe assembly comprising a relatively large number of pipe restraint assemblies.

Figure 12:
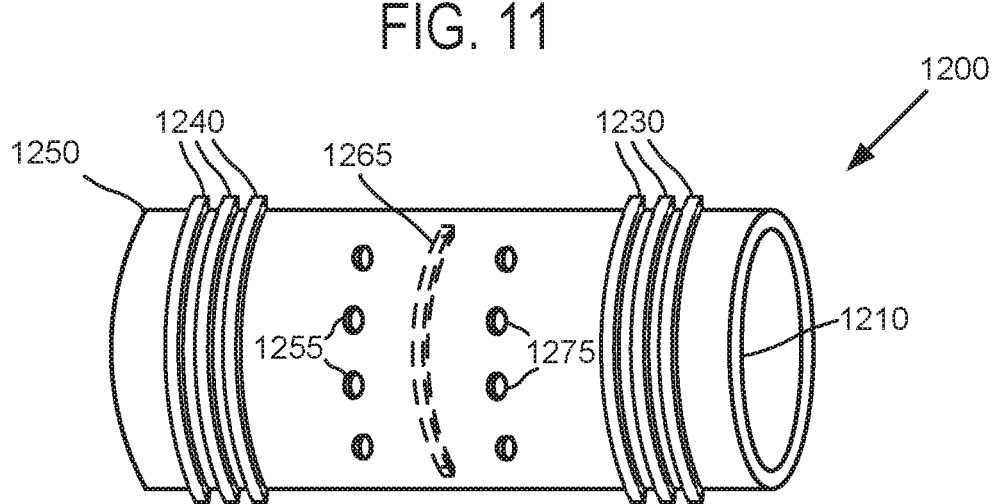
FIG. 12 illustrates yet a further example pipe restraint device.

FIG. 12 illustrates yet a further example pipe restraint device 1200. Pipe restraint device 1200 may be secured about a pipe by one or more sets of securing rings. A first set of securing rings 1230 may be located proximate to one end of a restraint body 1250, and a second set of securing rings 1240 may be located proximate to an opposite end of restraint body 1250.

The interior surface 1210 of restraint body 1250 may comprise a groove 1265. The groove 1265 may be located along an approximate middle of restraint body 1250. In some examples, groove 1265 may comprise an arcuate groove that traverses the entire circumference of the interior surface 1210 of restraint body 1250.

Groove 1265 may be sized and/or otherwise configured to at least partially surround a ring, ridge or arcuate protrusion formed on the exterior surface of a pipe. In some examples, the ridge may be formed from a pipe weldment, such as weldment 330 of FIG. 3. The weldment may be considered to provide a location where a postulated leak may occur.

Groove 1265 may be sized to be somewhat larger than the ring 335 (FIG. 3) created by weldment 330, such that by locating pipe restraint device 1200 about the pipe assembly where the two portions of piping are attached, the ring 335 may be seated or at least partially located within groove 1265.

By locating the ring 335 (FIG. 3) within groove 1265, the movement of pipe restraint device 1200 along the axial direction of the pipe assembly may be constrained. During a pipe rupture or in response to any other dynamic forces that may be experienced by the pipe assembly, the groove 1265 may therefore be configured to maintain the original position of the pipe restraint device 1200 about the weldment and/or about the postulated leak point of the pipe.

Additionally, pipe restraint device 1200 may comprise a plurality of diffusion holes. A first set of diffusion holes 1255 may be located adjacent one side of groove 1265, and a second set of diffusion holes 1275 may be adjacent the other side of groove 1265. Groove 1265 may be configured to maintain the position of the diffusion holes 1265, 1275 proximate to the postulated break point in the pipe. In some examples, restraint body 1250 may comprise two substantially identical halves which may be mounted to each other on opposite sides of the pipe.

Figure 13:
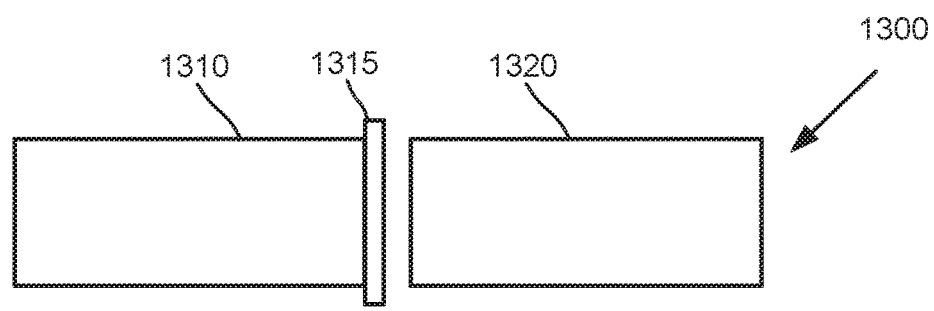
FIG. 13 illustrates an exploded view of an example pipe assembly.

FIG. 13 illustrates an exploded view of an example pipe assembly 1300 comprising a first portion of pipe 1310 and a second portion of pipe 1320. First portion of pipe 1310 may comprise a pipe flange 1315. First portion of pipe 1310 may be attached to second portion of pipe 1320 during a manufacturing process associated with pipe assembly 1300. For example, second portion of pipe 1320 may be welded to first portion of pipe 1310 at the pipe flange 1315. Pipe flange 1315 may be configured to be housed within a groove of a surrounding restraint assembly, such as groove 1265 of FIG. 12.

Figure 14:
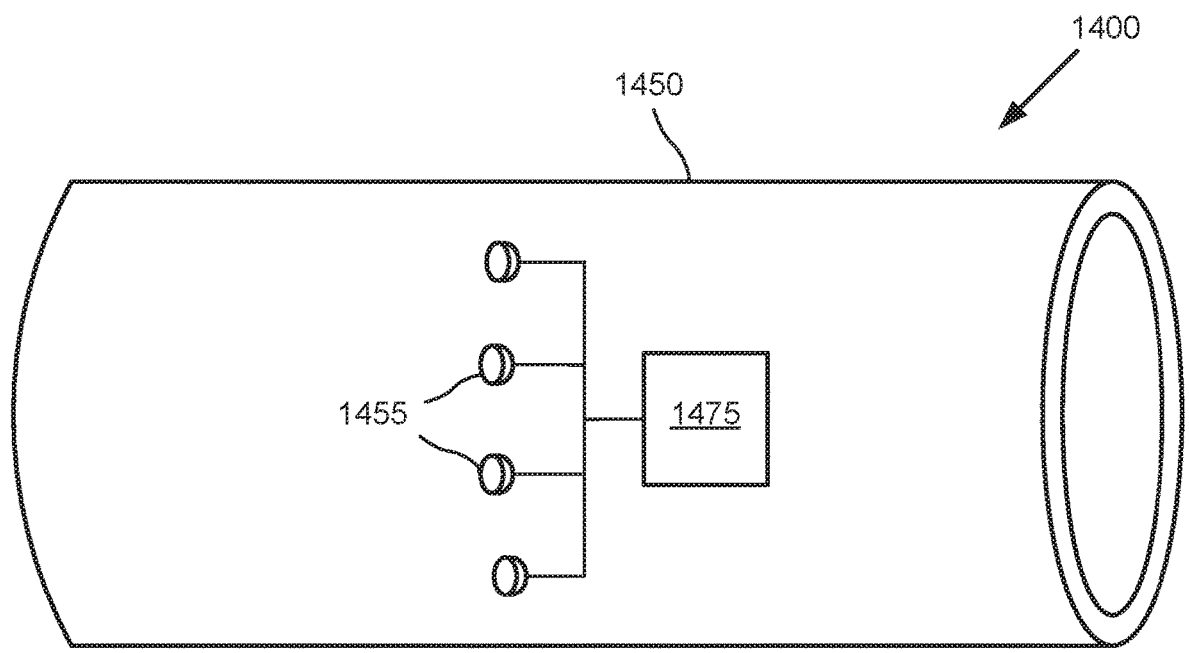
FIG. 14 illustrates an example pipe restraint assembly configured to indicate the presence of moisture.

FIG. 14 illustrates an example pipe restraint assembly 1400 configured to indicate the presence of moisture. A restraint body 1450 may comprise one or more moisture detection devices 1455. The one or more moisture detection devices 1455 may comprise a rupture disc, a sensor, a gauge, an electrode, a conductivity meter, or some other means of detecting the presence of moisture. Additionally, the one or more moisture detection devices 1455 may be electrically coupled to a moisture alert device 1475.

Moisture alert device 1475 may be configured to analyze or otherwise process any information or signals provided by the one or more moisture detection devices 1455. For example, moisture alert device 1475 may be configured to compare multiple signals from the one or more moisture detection devices 1455 to confirm the presence of moisture that was indicated by at least one of the detection devices.

Moisture alert device 1475 may be configured to generate an alert indicating the presence of moisture. The alert may indicate the possible occurrence of a pipe failure associated with pipe restraint assembly 1400. In some examples, moisture alert device 1475 may be configured to transmit the alert to a system controller for further processing. For example, in response to the alert, a reactor power module may be shut down and/or scheduled for maintenance.

Figure 15:
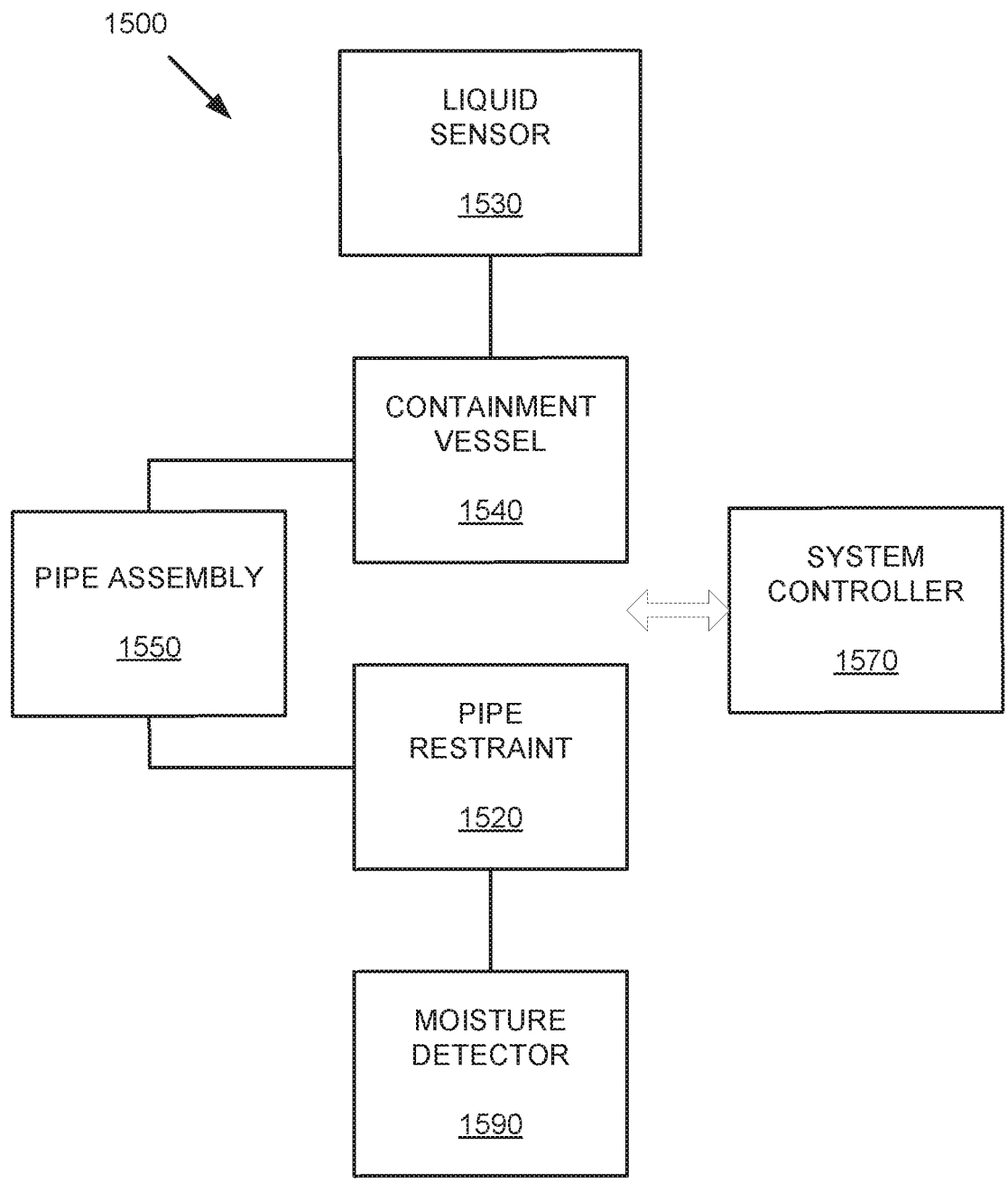
FIG. 15 illustrates an example system configured to detect fluid leakage in a pipe assembly.

FIG. 15 illustrates an example system 1500 configured to detect fluid leakage in a pipe assembly 1550. The pipe assembly 1550 may be configured to convey fluid within or through a containment vessel 1540.

A pipe restraint assembly 1520 may be located proximate to a postulated leak point in the pipe assembly 1550. The pipe restraint assembly 1520 may be configured to restrain the pipe assembly 1550 during any dynamic forces or seismic events. Additionally, the pipe restraint assembly 1550 may be configured to shield other components within the containment vessel 1540 during a pipe failure and to diffuse the pressure associated with any released fluid that results from the pipe failure.

A liquid sensor 1530 may be located in the containment vessel 1540. The liquid sensor 1530 may be configured to detect any liquid or moisture that may collect in the bottom of the containment vessel 1540, such as from a pipe leak. In some examples, the containment vessel 1540 may be internally dry during normal operation, and the presence of liquid may indicate a system failure or emergency operating condition.

The liquid sensor 1530 may be configured to generate a signal or an alert in response to the detected liquid. In response to the detection of liquid within containment vessel 1540, the pipe assembly 1550 may be inspected to determine the location of the pipe leak.

A moisture detection device 1590 may be configured to detect moisture that leaks into the pipe restraint assembly 1520. The moisture detection device 1590 may be configured to generate a signal or an alert in response to the detected moisture. In some examples, moisture detection device 1590 may be configured to produce a visual indication in response to the detected moisture. For example, moisture detection device 1590 may be configured to change color or activate a light, such as a light emitting diode.

Whereas liquid sensor 1530 may be configured to detect the presence of liquid within containment vessel 1540 in the general sense, moisture detection device 1590 may assist an operator or maintenance crew in identifying the specific location and/or portion of the pipe assembly at which the leak is occurring within the containment vessel. This may help expedite any further maintenance operations.

A system controller 1570 may be configured to receive and/or process information associated with a detected leak. For examples, one or more signals may be received from liquid sensor 1530 during system operation, and the signals may be monitored for any deviation or change that might suggest a leak has occurred. In some examples, system controller 1570 may also be configured to monitor one or more signals received from moisture detection device 1590. In other examples, moisture detection device 1590 may be configured to provide local indications of leaks, which may not be electronically transmitted to system controller 1570.

Figure 16:
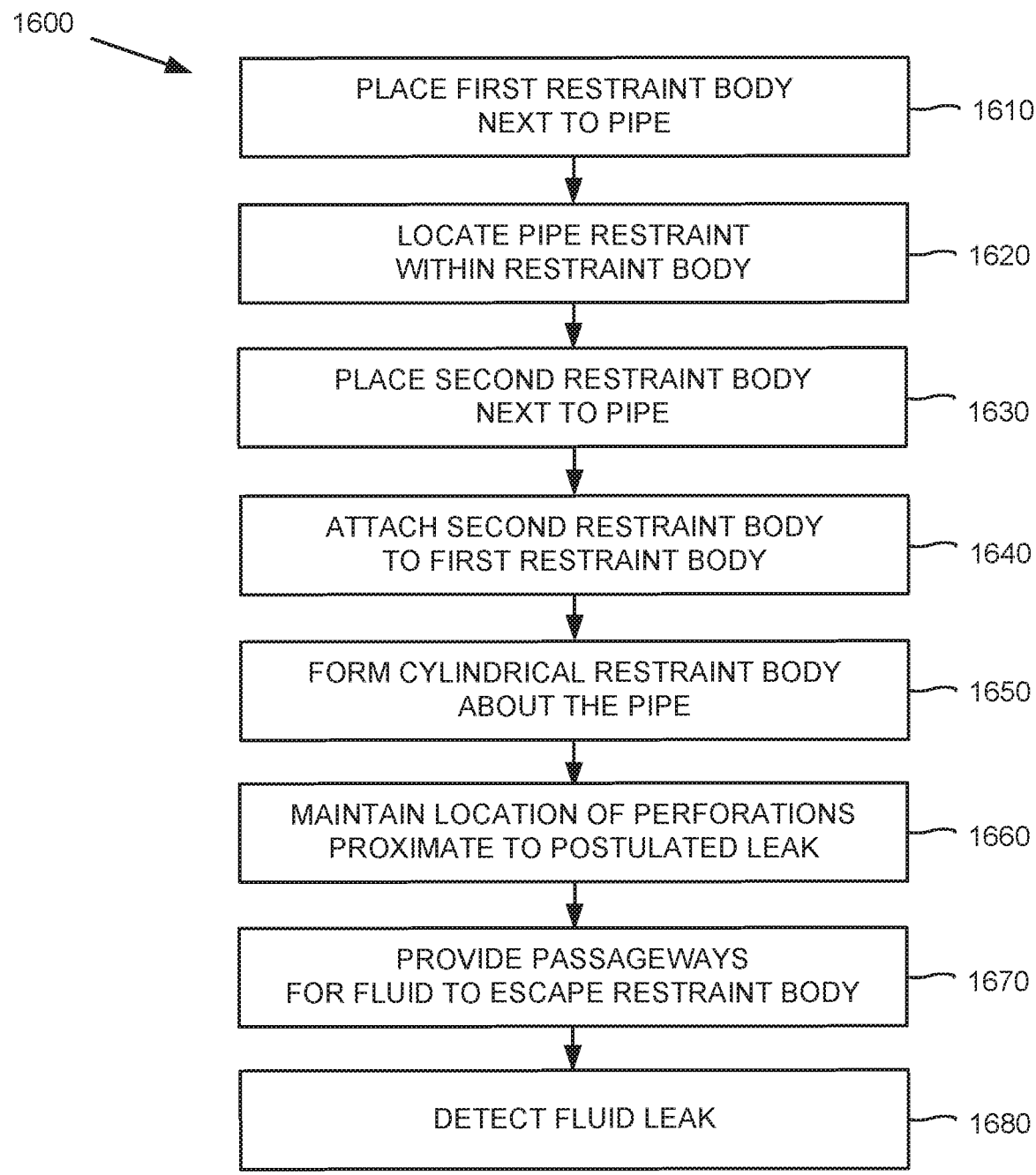
FIG. 16 illustrates an example process of assembling a pipe restraint system.

FIG. 16 illustrates an example process 1600 of assembling a pipe restraint system. At operation 1610, a first restraint body may be placed next to the location of a postulated pipe failure associated with a pipe. The first restraint body may comprise a receptacle.

At operation 1620, a pipe protrusion may be located within the receptacle of the first restraint body. The pipe protrusion may comprise a stud, a ridge, a ring, or some other type of feature that projects from the pipe. The pipe protrusion may be welded to the pipe. Additionally, the receptacle may comprise a through-hole that penetrates through a cylindrical wall of the restraint body. In some examples, the pipe protrusion may comprise an arcuate ridge formed on the pipe, and the receptacle may comprise an arcuate groove sized to fit the arcuate ridge At operation 1630, a second restraint body may be placed next to the location of the postulated pipe failure. Both the first restraint body and the second restraint body may comprise a receptacle. Two pipe protrusions may be located on either side of the pipe, proximate to the location of the postulated pipe failure. The two pipe protrusions may be located with the two receptacles associated with the first and second restraint bodies.

At operation 1640, the second restraint body may be attached to the first restraint body. In some examples, the second restraint body may be removably attached to the first restraint body such that the assembled pipe restraint system is loosely coupled to the pipe.

At operation 1650, the attached restraint bodies may form a substantially cylindrical restraint body that surrounds the location of the postulated pipe failure. The second restraint body may be attached to the first restraint body by securing a number of bolts or other types of securing devices through adjacent mounting plates attached to the cylindrical restraint body.

At operation 1660, the position of the cylindrical restraint body may be restrained by the pipe protrusion in an axial direction of the pipe to maintain a position of the plurality of perforations proximate to the location of the postulated pipe failure At operation 1670, a plurality of perforations that pass through the cylindrical restraint body may provide a number of passageways for fluid to exit from the location of the postulated pipe failure and be released outside of the cylindrical restraint body.

At operation 1680, a fluid leak associated with the postulated pipe failure may be detected. The fluid leak may be detected at the pipe restraint system. In other examples, the fluid leak may be detected at the bottom of a containment vessel that houses the pipe restraint system.

Although some of the pipe restraints systems described herein have been disclosed as operating with a steam generation system and related piping, other types of systems and piping assemblies are contemplated herein, including those for reactor modules and other types of applications. For example, one or more of the pipe restraints systems and methods may be used for a reactor coolant system, a chemical and volume control system, a feedwater system, a decay heat removal system, and other systems with pipes.

Pipes that may be retained by the pipe restraint systems may range from less than two inches in diameter to twelve or more inches in diameter. The restraint systems may include restraint bodies which are associated with larger diameters than the pipes. However, any rates and values described herein are provided by way of example only. Other rates and values may be determined through experimentation such as by construction of full scale or scaled models of a nuclear reactor system.

One or more example systems described herein may comprise various nuclear reactor technologies, and may comprise and/or be used in conjunction with nuclear reactors that employ uranium oxides, uranium hydrides, uranium nitrides, uranium carbides, mixed oxides, and/or other types of fuel. Although the examples provided herein have primarily described a pressurized water reactor and/or a light water reactor, it should be apparent to one skilled in the art that the examples may be applied to other types of power systems. For example, the examples or variations thereof may also be made operable with a boiling water reactor, sodium fluid metal reactor, gas cooled reactor, pebble-bed reactor, and/or other types of reactor designs.

Having described and illustrated various examples herein, it should be apparent that other examples may be modified in arrangement and detail. We claim all modifications and variations coming within the spirit and scope of the following claims.

The invention claimed is:

1. A pipe restraint assembly, comprising:
a restraint body configured to be removably attached to a portion of pipe, wherein the portion of pipe is associated with a postulated pipe failure associated with a release of high pressure fluid;
a plurality of apertures that penetrate through the restraint body and are positioned proximate to a location of the postulated pipe failure;
one or more pipe restraints permanently attached to the pipe and extending out from an exterior surface of the pipe, wherein at least one of the one or more pipe restraints extends into at least one of the apertures to maintain the position of the apertures relative to the location of the postulated pipe failure.

2. The pipe restraint assembly of claim 1, including a ridge formed along at least a portion of the circumference of the pipe, wherein the restraint body comprises a groove formed on an interior surface of the restraint body, and wherein the groove is configured to fit around the ridge.

3. The pipe restraint assembly of claim 2, wherein the ridge is formed from built-up weldment material formed on the surface of the portion of pipe.

4. The pipe restraint assembly of claim 2, wherein the ridge comprises a pipe flange configured to join to portions of pipe together.

5. The pipe restraint assembly of claim 1, further comprising an annular gap formed between an exterior surface of the pipe and an interior surface of the pipe restraint system, wherein the annular gap interconnects the plurality of apertures to the location of the postulated pipe failure.

6. The pipe restraint assembly of claim 5, wherein the annular gap encompasses the circumference of the exterior surface of the pipe.

7. The pipe restraint assembly of claim 1, wherein the restraint body comprises two partial cylindrical portions, wherein the two partial cylindrical portions are mounted together around the pipe to form the restraint body, and wherein each partial cylindrical body comprises one or more of the plurality of apertures configured to controllably release the fluid outside of the restraint body.

8. The pipe restraint assembly of claim 7, further comprising two endplates attached to either end of the restraint body, wherein the endplates are oriented perpendicular to the axis of the pipe, and wherein the pipe passes through the approximate center of both endplates.

9. A pipe restraint assembly, comprising:
a restraint body configured to be removably attached to a portion of pipe, wherein the portion of pipe is associated with a postulated pipe failure associated with a release of high pressure fluid;
a plurality of apertures that penetrate through the restraint body and are positioned proximate to a location of the postulated pipe failure, wherein the apertures are configured to provide a number of passageways for the fluid to exit from the location of the postulated pipe failure and be released outside of the restraint body; and
one or more pipe restraints, wherein at least one of the one or more pipe restraints extends into at least one of the apertures to maintain the position of the apertures relative to the location of the postulated pipe failure, wherein the one or more pipe restraints each comprise a stud that is welded to the exterior surface of the pipe, and wherein the stud extends into one of the apertures.

10. A pipe restraint assembly, comprising:
a restraint body configured to be removably attached to a portion of pipe, wherein the portion of pipe is associated with a postulated pipe failure associated with a release of high pressure fluid;
an aperture that penetrates through the restraint body and is positioned proximate to a location of the postulated pipe failure, wherein the aperture is configured to provide a passageway for the fluid to exit from the location of the postulated pipe failure and be released outside of the restraint body; and a pipe restraint permanently attached to the pipe and extending out from an exterior surface of the pipe and into the aperture to maintain a position of the aperture relative to the location of the postulated pipe failure.

11. The pipe restraint assembly of claim 10, wherein the pipe restraint comprises a stud that is welded to the exterior surface of the pipe and extends into the aperture.

12. The pipe restraint assembly of claim 10, including a ridge formed along at least a portion of the circumference of the pipe, wherein the restraint body comprises a groove formed on an interior surface of the restraint body, and wherein the groove is configured to fit around the ridge.

13. The pipe restraint assembly of claim 12, wherein the ridge is formed from built-up weldment material formed on the surface of the portion of pipe.

14. The pipe restraint assembly of claim 10, wherein the restraint body comprises two partial cylindrical portions, wherein the two partial cylindrical portions are mounted together around the pipe to form the restraint body, and wherein one of the cylindrical portions forms the aperture configured to controllably release the fluid outside of the restraint body.

15. The pipe restraint assembly of claim 10, including an opening formed between the aperture and a periphery of the pipe restraint when the aperture extends out into the aperture, the opening configured to provide a passageway for the fluid to exit from the location of the postulated pipe failure and be released outside of the restraint body.

* * * * *